June 6, 1939.  J. H. McLEOD  2,161,368
LENS MOUNT
Filed July 16, 1937

J. H. McLeod
INVENTOR.

BY Newton M. Perrins
Rolla N. Carter
ATTORNEYS

Patented June 6, 1939

2,161,368

UNITED STATES PATENT OFFICE 2,161,368

LENS MOUNT

John Henry McLeod, Rochester, N. Y., assignor to Eastman Kodak Company, Rochester, N. Y., a corporation of New Jersey Application July 16, 1937, Serial No. 154,018

10 Claims. (Cl. 88—24)

This invention relates to optical systems used in the recording or reproduction of sound motion pictures. It relates particularly to lens mounts for supporting sound optical systems.

It is common practice to use aspherical, usually cylindrical, lenses in sound optical systems. Satisfactory lenses for this purpose can be molded, i. e., pressed. It is an object of the invention to provide a mount which permits convenient and accurate assembly of pressed aspherical lenses to form an optical system of predetermined optical arrangement.

In any optical system made up of a plurality of spaced components, the axial separation of the components is critical. It is an object of the invention to provide a lens mount into which the various components may be inserted in a manner which insures the correct axial separation, and to this end, a lens mount consisting of a hollow tube is provided with recesses in the side walls thereof shaped to receive the individual lens components and spaced so that when the components are inserted therein, they are in their correct positions.

To permit even more exact placement of the components, resilient members are provided which are inserted between each component and one side of the recess to urge the component into a rigid position against the other side of the recess. Thus the lens components are rigidly held in correct, axial relation.

According to another feature of my invention the pressed aspherical lenses are formed so that the optic axis is in each case the same distance from the lower edge of the lens. The term, lower, is used merely in a relative sense and the terms, horizontal and vertical, will be used in the same relative sense and do not necessarily refer to the orientation in space. Also, according to this feature of my invention, the floor or lower edge of the lens mount is made horizontal so that when the lens components rest on the floor, the components are accurately aligned, i. e. have coincident optic axes.

The periphery of each component is made of a rotation-restricting shape and the mount consists of a tube of similar shape, such as rectangular so that rotation of the individual components in their own planes is prohibited.

The spring members mentioned above are inserted with some or all of the components and according to another feature of my invention, at least one of the spring members comprises a diaphragm for the system.

According to a particular embodiment of my invention a plurality of pressed cylindrical lenses are mounted in a tapered tube of rectangular cross section having horizontal floor and ceiling and converging walls. Oppositely positioned recesses are provided in the walls to receive the lenses which are of the same height but of different widths. The tapering of the tube permits a series of lenses of increasing or decreasing diameter to be mounted without additional brackets for the individual elements.

Other objects and advantages of my invention will be apparent from the following description of this particular embodiment of the invention when read in connection with the accompanying drawing in which.

Figure 1:
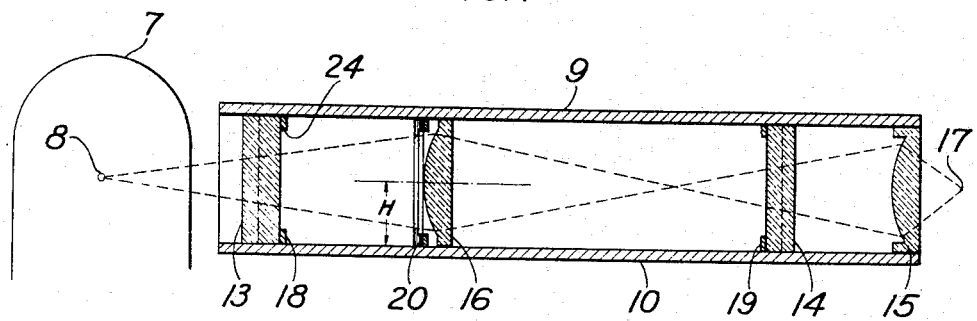
Figure 1 is a vertical cross section of a sound optical system employing my invention.

In Figure 1 a light source 7, having a substantially linear horizontal filament 8, illuminates an optical system comprising four cylindrical lenses 13, 14, 15, and 16, which form an intense uniform horizontal line of light 17 to be used in the reproduction of sound-on-film. A similar optical system may be employed in the recording of sound-on-film.

Figure 2:
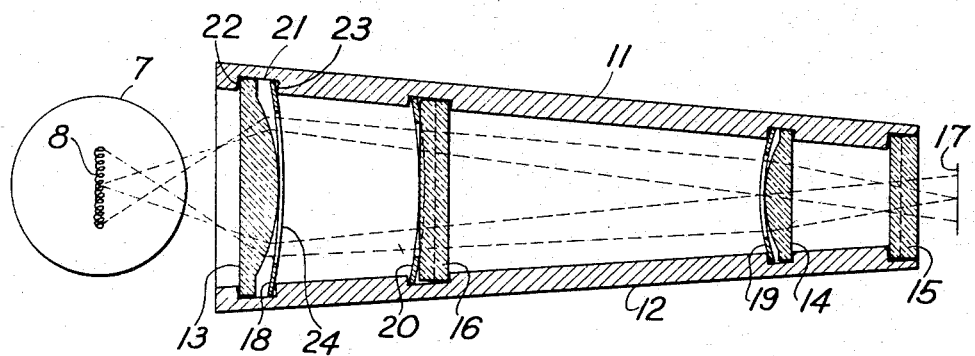
Figure 2 is a horizontal cross section of the arrangement shown in Figure 1.

The lens mount as shown in Figures 1 and 2 comprises a tapered or wedge-shaped tube of rectangular cross section having a horizontal ceiling 9, a horizontal floor 10 and converging walls 11 and 12. The lens components all have the same height and a rectangular periphery with the lower edge thereof a distance H from the optic axis in each case. With the exception of the last lens 15, all of the lenses are mounted in a similar manner which will therefore be described in detail only with respect to the first lens 13. Vertical recesses such as 21 are cut in opposite pairs in the walls 11 and 12. One edge 22 of this recess 21 is critically placed so that when the lens 13 is urged into a rigid position by a spring member 18 against this side 22 of the recess 21, the lens 13 is accurately positioned in a predetermined position depending on the optics of the system which need not be discussed in detail here. The spring member 18 may be held in any convenient manner by the walls or floor and ceiling of the lens mount, preferably by also inserting it in the recess 21 so that it presses against the sides 23 thereof.

As shown in Figures 1 and 2 the spring member 18 has a rectangular window 24 cut therein which acts as a diaphragm for the lens 13. Similar spring diaphragms 19 and 20 are provided for the lenses 14 and 16 respectively.

If a tube were used having the sides 11 and 12 parallel, lens elements 14 and 15 would require extensions or brackets to reach the recesses. However, by tapering the tube as shown by an amount determined primarily by lenses 13 and 14 (it is relatively simple to manufacture lenses 15 and 16 of any desired length in this dimension) the use of such brackets is eliminated.

Figure 3:
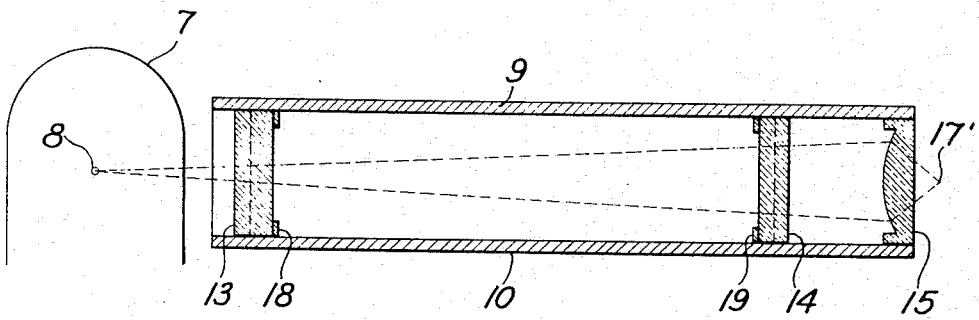
Figure 3 is a vertical cross section of a convenient modification of the arrangement shown in Figure 1.

In Figure 3 the lens 16 and its diaphragm 20 have been omitted giving an image 17' somewhat nearer the lens 15. As shown in the drawing the cylindrical axis in each case is either vertical or horizontal, and for this reason I prefer to use lenses having rectangular periphery. However, the invention may be practiced with any aspherical lenses having a periphery of rotation-restricting shape. I use the term "aspherical" to include any cylindrical or other non-spherical lens surface, preferably, as far as the invention is concerned, any surface having different major and minor curvatures such as cylinders, tores, sides of ellipsoids, etc.

Furthermore the floor 10 need not be horizontal unless the height H is the same for each lens as in the case illustrated, but should be shaped to insure that the optic axes of the components are coincident. However, because of the accuracy and convenience of the arrangement described it is the preferred form. Also, although I prefer to have the recesses cut vertically in the walls, under certain circumstances it may be desirable to have the recesses in all four walls or in any pair of opposite walls.

Having thus disclosed the principle of my invention, the manner in which it may be applied and one particularly attractive embodiment of it, I wish to point out that the invention is not limited to the specific structures shown but is of the scope of the appended claims.

What I claim and wish to secure by Letters Patent of the United States is:

1. In an optical system, a lens having a non-circular periphery, a tubular mount for the lens having an internal cross section substantially fitting said periphery for holding the lens in a definite orientation, the inner walls of said mount being shaped to form oppositely positioned abutments against the margins of the lens and flat spring members pressing the lens against the abutments and having a centrally located aperture for defining the diaphragm opening of the lens.

2. An optical apparatus comprising a tubular mount of rectangular cross section, the inner walls having at least two oppositely positioned recesses, an aspheric lens of rectangular periphery marginally engaging one side of both recesses substantially to the full depth of said recesses and a resilient member engaging the other side of each recess and urging the lens against the first mentioned side.

3. An optical apparatus comprising a tubular mount of non-circular cross section, the inner walls of the tube having at least two oppositely positioned recesses, a cylindrical lens of non-circular periphery substantially congruent with said cross section, said lens engaging one side of both recesses and a resilient sheet member engaging the other side of both recesses and urging the lens against the first mentioned side, said resilient member having a centrally located opening acting as a diaphragm for the lens.

4. An optical apparatus comprising a tubular mount of rectangular cross section, the inner walls of the tube having at least two oppositely positioned recesses, a cylindrical lens of rectangular periphery engaging one side of both recesses and a resilient rectangular sheet diaphragm engaging by one pair of its opposite edges the other side of both recesses and by the other pair of its opposite edges the margins of the lens, thus positioning the lens against the first mentioned side of both recesses.

5. An optical apparatus comprising a tubular mount of non-circular cross section, a cylindrical lens having a non-circular periphery which periphery has a definite orientation with respect to the cylindrical axis of the lens, the inner walls of the tube having oppositely positioned recesses fitting said periphery to maintain a definite orientation of said axis relative to the mount, and limiting longitudinal movement of the lens and a resilient diaphragm in said recesses engaging the margin of the lens and holding it by resilient pressure against one side of the recesses in proper longitudinal position.

6. An optical apparatus comprising a mount of rectangular cross section, of uniform height and tapering in width throughout its length, its converging side walls having pairs of oppositely positioned recesses and a plurality of aspherical lenses with rectangular peripheries each engaging one pair of said recesses, the optical axes of the lenses being in alignment at the same distance from the bottom wall of the mount.

7. An optical apparatus comprising a mount of rectangular cross section, of uniform height and tapering width, at least two of its inner walls having pairs of oppositely positioned recesses, a plurality of aspherical lenses with rectangular peripheries each engaging one pair of said recesses, the optical axes of the lenses being in alignment at the same distance from the bottom wall of the mount and a resilient diaphragm engaging one pair of recesses and holding the lens in said pair of recesses securely in position therein.

8. An optical apparatus comprising a mount of rectangular cross section, of uniform height and tapering width, at least two of its inner walls having pairs of oppositely positioned recesses, a plurality of aspherical lenses with rectangular peripheries each engaging one pair of said recesses, the optical axes of the lenses being in alignment at the same distance from the bottom wall of the mount and resilient members engaging certain of the pairs of recesses and holding the lenses in such pairs of recesses securely in position therein, at least one of said resilient members acting as a diaphragm for the lens system.

9. An optical apparatus comprising a mount of rectangular cross section, of uniform height and tapering in width throughout its length, its converging side walls having pairs of oppositely positioned recesses, a plurality of cylindrical lenses with rectangular peripheries and with their cylindrical axes rectilinearly oriented therewith, each of said lenses engaging one pair of said recesses, the optical axes of the lenses being in alignment at the same distance from the bottom wall of the mount and a plurality of resilient rectangular sheet members each engaging a pair of recesses with its side edges and marginally engaging the corresponding lens with its top and bottom edges holding said lens securely in position against one side of both recesses, each resilient member having a centrally located opening therein and at least one of said openings acting as a diaphragm for the optical system.

10. An optical apparatus comprising a tubular mount of rectangular cross section, and having in its inner walls pairs of oppositely positioned recesses, a plurality of lenses with rectangular peripheries each engaging one pair of said recesses, the optical axes of the lens being in alignment centrally located in the tube and at least one of the lenses being cylindrical with its cylindrical axis rectilinearly oriented with respect to its periphery and resilient members in the recesses engaging the margins of the lenses and pressing the lenses against the edges of the recesses.

JOHN HENRY McLEOD.